United States Patent [19]

Banton

[11] 4,336,993
[45] Jun. 29, 1982

[54] LIGHT COLLECTOR ROD FOR USE IN XEROGRAPHIC SYSTEMS

[75] Inventor: Martin E. Banton, Fairport, N.Y.

[73] Assignee: Xerox Corporation, Stamford, Conn.

[21] Appl. No.: 183,122

[22] Filed: Sep. 2, 1980

[51] Int. Cl.³ .............................................. G03G 15/00
[52] U.S. Cl. ................................. 355/3 R; 250/227; 350/96.10; 350/96.15; 355/1
[58] Field of Search .......................... 355/1, 3 R, 5, 7; 350/96.10, 96.15; 250/227

[56] References Cited

U.S. PATENT DOCUMENTS

| | | | |
|---|---|---|---|
| 3,317,738 | 5/1967 | Piepenbrink et al. | 250/227 |
| 3,491,245 | 1/1970 | Hardesty | 250/227 |
| 3,519,344 | 7/1970 | Clark et al. | 355/5 |
| 3,660,818 | 5/1972 | Amodei et al. | 355/5 X |
| 4,019,186 | 4/1977 | Dressen et al. | 250/227 X |
| 4,042,962 | 8/1977 | Yamaji et al. | 355/3 R X |

Primary Examiner—Fred L. Braun
Attorney, Agent, or Firm—Frederick E. McMullen

[57] ABSTRACT

A light collector for collecting light reflected from a photoconductive surface bearing a developed image and scanned by a flying spot scanner. The collector includes a rod-like element, the central core of which is made up of a relatively rigid transparent material. The core is encased by a cladding material having an index of refraction lower than that of the core. A light diffusing coating is provided on the outer surface of the cladding material, except for a slit-like aperture for receiving light reflected from the photoconductive surface. In an alternate embodiment, the dimention of the light receiving aperture is varied uniformly along the length of the collector, the size of the aperture at the collector center being at a minimum. In a further embodiment, a slit-like axial section of the cladding material opposite the light receiving aperture is removed and replaced by a highly reflecting, light diffusing coating.

5 Claims, 6 Drawing Figures

LIGHT COLLECTOR ROD FOR USE IN XEROGRAPHIC SYSTEMS

This invention relates to a light collector for collecting light reflected from the surface of a photoconductor bearing a developed image, and more particularly to a light collector in the form of a clad rod.

In xerographic systems of the type wherein the toner developed image on the system photoconductive member is scanned by a flying spot beam, the light reflections therefrom are converted to analog image signals representative of the developed image being scanned. One manner of doing so utilizes a light collector disposed adjacent the photoconductive surface to gather or collect the scattered and reflected light emanating from the photoconductive surface.

While light collectors may take various forms, a preferred type, because of its small size and relatively low cost, is a transparent rod. However, the light collection efficiency of a rod is so low as to effectively rule out use of this device. Attempts to improve the collection efficiency of rod-type collectors by applying various reflective or opaque coatings to the exterior thereof has resulted in some improvement. Still, despite modifications and improvements, the collection efficiency of rod-type collectors remains marginal.

This invention relates to a combination of xerographic copier and raster scanner adapted to scan developed images on the copier photoconductive surface with a light beam, a transparent collector rod spaced opposite to and astride the path of movement of the photoconductive surface for collecting light reflected from the photoconductive surface, a light sensor at at least one end of the rod, cladding means covering the exterior of said rod, except for a slit-like aperture in the cladding means, a diffusing surface covering the aperture and the surface of the cladding means except for a second slit-like aperture opposite the first-mentioned aperture, the second aperture enabling light reflected from the photoconductive surface to enter the rod, the diffusing surface over the first aperture diffusing the light entering the rod through the second aperture into the rod interior.

There is shown herein a multi-mode reproduction apparatus operable selectively in a COPY mode to xerographically make copies of original documents in the manner typical of xerographic copiers or machines, in a WRITE mode to xerographically produce copies from image signals input thereto using a flying spot type scanner, and in a READ mode to read images developed on the machine photoreceptor with the same flying spot scanner to produce image signals representative thereof and thereby convert the image to electronic signals.

Figure 1:
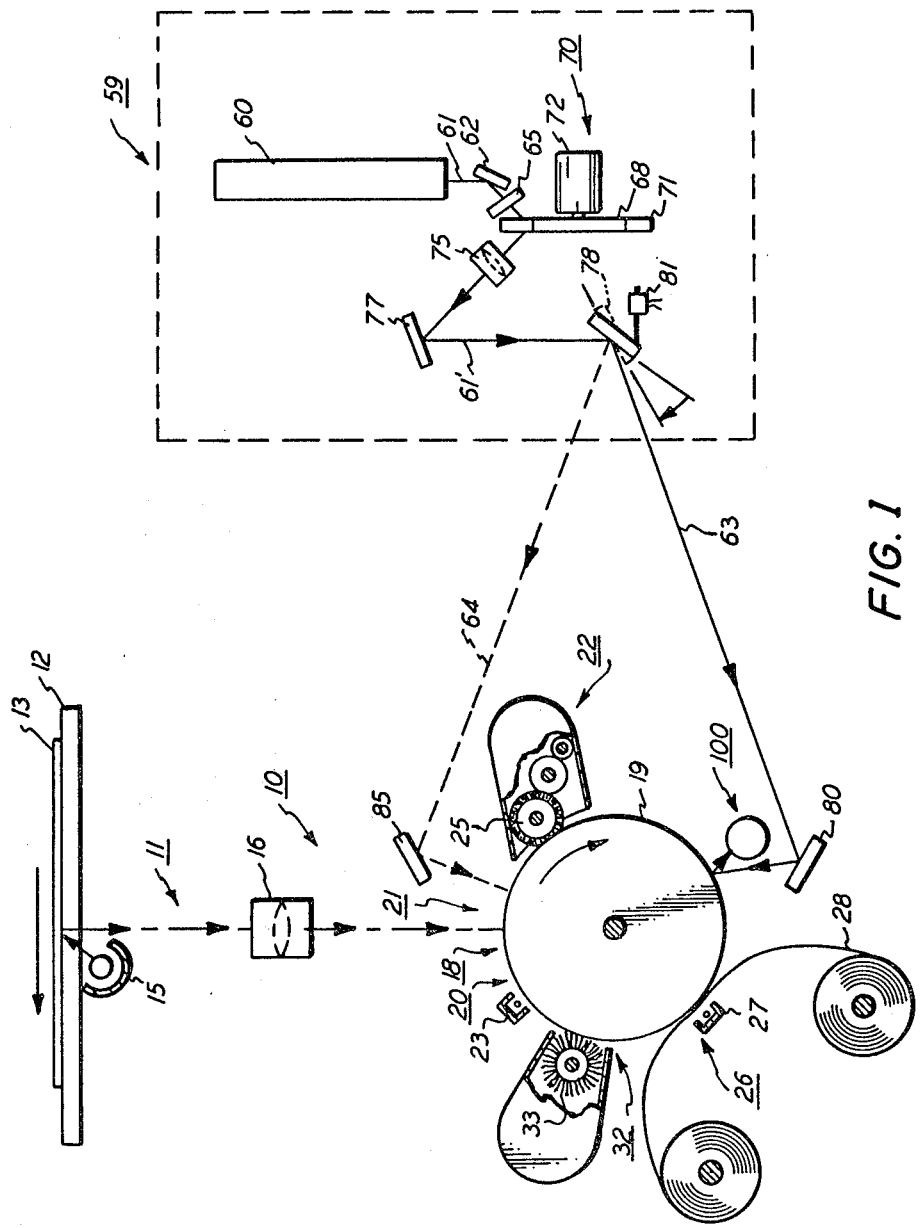
FIG. 1 is a schematic view showing an exemplary apparatus for carrying out multiple function image processing incorporating the improved light collector of the present invention.
Figure 2:
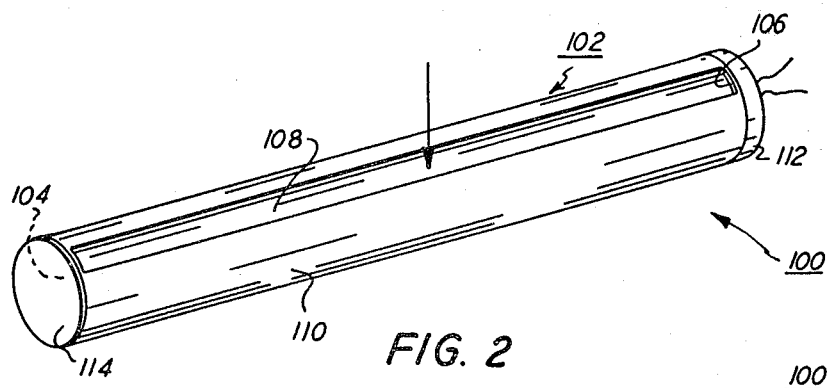
FIG. 2 is an isometric view showing details of the light collector shown in FIG. 1.

Referring now particularly to FIGS. 1 and 2 of the drawings, there is shown an exemplary xerographic type reproduction apparatus 10 incorporating the present invention. Xerographic reproduction apparatus 10 includes a viewing station or platen 12 where document originals 13 to be reproduced or copied are placed. For operation in the COPY mode as will appear more fully herein, a light/lens imaging system II is provided, the light/lens system including a light source 15 for illuminating the original 13 at platen 12 and a lens 16 for transmitting image rays reflected from the original 13 to the photoconductive surface 19 of drum 18 at exposure station 21.

Charging, developing, transfer, and cleaning stations 20, 22, 26, 32 respectively are disposed about drum 18 in operative relation thereto. Charging station 20 includes a corona charging means 23 for depositing a uniform electrostatic charge on the photoconductive surface 19 of drum 18 in preparation for imaging. A suitable developing mechanism, which may for example comprise a magnetic brush 25, is provided at developing station 22 for developing the latent electrostatic images created on drum 18.

At transfer station 26, corona transfer means 27 effects transfer of the developed image to a suitable copy substrate material 28. A suitable drum cleaning device such as a rotating cleaning brush 33 is provided at cleaning station 32 for removing leftover developing materials from the surface 19 of drum 18. Brush 33 may be disposed in an evacuated housing through which leftover developer materials removed from the drum surface by the cleaning brush are exhausted. A suitable erase lamp (not shown) may be provided to discharge residual charges on the photoconductive surface 19 prior to charging by charging means 23.

In the example shown, photoconductive surface 19 comprises a uniform layer of photoconductive material such as amorphous selenium on the surface of drum 18. Drum 18 is supported for rotation by suitable bearing means (not shown). A suitable drive motor (not shown) is drivingly coupled to drum 18 and rotates drum 18 in the direction shown by the solid line arrow when processing copies.

When operating in the COPY mode, the photoconductive surface 19 of drum 20 is charged to a uniform level by corona charging means 23. Platen 12 and the original document 13 thereon is irradiated by light source 15, the light reflected from document 13 being focused onto the photoconductive surface 19 of drum 18 by lens 16 at exposure station 21. Platen 12 and the document 13 thereon are at the same time moved in synchronism with rotation of the drum 18. The light reflected from the original 13 selectively discharges the charged photoconductive surface in a pattern corresponding to the image that comprises the original document.

The latent electrostatic image created on the surface 19 of drum 18 is developed by magnetic brush 25 and transferred to copy substrate material 28 through the action of transfer corona means 27. Following transfer, the photoconductive surface 19 of drum 18 is cleaned by cleaning brush 33 to remove leftover developer material. A suitable fuser or fixing device (not shown) fixes the image transferred to copy substrate material 28 to render the copy permanent.

While a drum type photoconductor is illustrated other photoconductor types such as belt, web, etc. may be envisioned. Photoconductive materials other than selenium, as for example, organic may also be contemplated. And while a scan type imaging system is illustrated, other types of imaging systems such as full frame flash, may be contemplated.

The photoconductor may be opaque, that is, impervious to light, or wholly or partially transparent. The exemplary drum 18 typically has an aluminum substrate which renders the drum opaque. However, other substrate materials such as glass may be contemplated, which would render drum 18 wholly or partially transparent. One material consists of an aluminized mylar substrate having a layer of selenium dispersed in poly-N-vinyl carbazole with a transparent polymer overcoating containing a charge transport compound such as pyrene.

Xerographic reproduction apparatus 10 includes a flying spot scanner 59. Scanner 59 has a suitable flux source of electro-magnetic radiation such as laser 60. The collimated beam 61 of monochromatic radiation generated by laser 60 is reflected by mirror 62 to a modulator 65, which for operation in the WRITE mode, modifies the beam 61 in conformance with information contained in image signals input thereto, as will appear. Modulator 65 may comprise any suitable modulator, such as acousto-optic or electro-optic type modulators for imparting the informational content of the image signals input thereto to beam 61.

Beam 61 is diffracted by disc reflector 68 of a holographic deflector unit 70. Deflector 68 comprises a substantially flat disc-like element having a plurality of grating faces or facets 71 forming the outer periphery thereof. Deflector 68 which is preferably glass, is driven by motor 72. Preferably, deflector 68 is disposed so that light beam 61 is incident to the facets 71 thereof at an angle of substantially 45°. The diffracted scanning beam 61' output by deflector 68 exits at a complementary angle.

The scanning beam 61' output by deflector 68 passes to an imaging lens 75. As shown, lens 75 is located in the optical path between deflector 68 and mirror 77, lens 75 being of a diameter suitable to receive and focus the scanning light beam diffracted by facets 71 of deflector 68 to a selected spot in the focal plane proximate the surface 19 of drum 18, as will appear.

The scanning beam 61' from lens 75 is reflected by mirror 77 to read/write control mirror 78, which in turn, reflects the beam to provide selectively image READ beam 63 (shown by solid line in FIG. 1) or image WRITE beam 64 (shown by dotted line in FIG. 1). Image READ beam 63 is reflected by mirror 80 to a location on the surface 19 of drum 18 downstream of developer 22, while image WRITE beam 64 is reflected by mirror 85 to a location on surface 19 upstream of developer 22.

In the case where the photoconductive material is opaque, a portion of the light impinging on the surface 19 of drum 18 is reflected. In the case where the photoconductive material is transparent, the light is transmitted, depending on the degree of transparency of the photoconductive material through the photoconductive material to the drum interior. As will be understood, reflected light is composed of both specular and diffuse reflected light while transmitted light is composed of specular and diffuse transmitted light. The reflected or transmitted light from the photoconductive surface 19 of drum 18 and the developed image thereon is collected in collector 100, and there converted to image signals, as will appear.

Read/write control mirror 78 is supported for limited movement between a READ position (shown in solid line in the drawing) and a WRITE position (shown in dotted line in the drawing). A suitable driving mechanism such as solenoid 81 is provided to selectively move the mirror 78 from one position to the other. Return spring means (not shown) may be provided to return mirror 78 to the original position upon deenergization of solenoid 81.

OPERATION

In the COPY mode, latent electrostatic images are formed on the photoconductive surface 19 of drum 18 through exposure of the document 13 on platen 12 as described heretofore. In the WRITE mode, latent electrostatic images are created on the charged photoconductive surface 19 of drum 18 by means of the flying spot scanner 59 in accordance with image signals input thereto. In this mode, solenoid 81 is energized to move control mirror 78 to the WRITE position (the dotted line position shown in FIG. 1). In this position, mirrors 78, 85 cooperate to provide image WRITE beam 64 at a point on the surface 19 of drum 18 upstream of developing station 22. Modulator 65 modulates the light intensity of beam 64 in accordance with the content of the image signals input thereto so that image WRITE beam 64 dissipates the electrostatic charge on the drum surface to create a latent electrostatic image representative of the image signals input thereto as beam 64 scans thereacross. The electrostatic latent image so created is thereafter developed by magnetic brush 25 and transferred to copy substrate material 28 by corona transfer means 27 at transfer station 26. Following transfer, the surface of drum 18 is cleaned by cleaning brush 33 as described.

In this mode, and in the image READ mode described below, deflector 68 is continually driven at substantially constant velocity by motor 72. In the WRITE mode, the image signal source is controlled so as to be synchronized with rotation of deflector 68. The rotational rate of xerographic drum 18 which determines the spacing of the scan line, is preferably synchronized to the signal source in order to maintain image linearity.

In the image READ mode, where it is desired to read original 13 and convert the content thereof to image signals, solenoid 81 is deenergized to place control mirror 78 in the READ position (the solid line position shown in FIG. 1). In this position, mirror 78 cooperates with mirror 80 to provide image READ beam 63 on the surface 19 of drum 18 at a point downstream of developing station 22, beam 63 scanning across the surface of drum 18 and any image developed thereon.

In this mode, a latent electrostatic image of the original 13 on platen 12 is created on the surface 19 of drum 18 through exposure of the original 13 and subsequent development by magnetic brush 25 in the manner described heretofore. As the developed image is carried on drum 18 from developing station 22 to transfer station 26, the image is scanned line by line by image READ beam 63. The light is reflected from the photoconductive surface 19 in accordance with the presence or absence of toner on the drum surface, the reflected light being picked up by collector 100 and converted to image signals as will appear hereinafter. As will be understood where the light beam strikes toner, the light is absorbed and no light is reflected. Where the light beam strikes uncovered portions of the photoconductive surface 19 of drum 18, a portion of the light is reflected back by the photoconductive surface to collector 100. The presence or absence of light is sensed by collector 100 which provides an analog image signal representative of the developed image scanned as will appear. Image signals generated by collector 100 may be used to produce additional copies of the original 13, or stored, or transmitted to a distant point, etc.

Following scanning, the developed image on drum 18 may be transferred to substrate material 28 in the manner described heretofore. Alternately, transfer may be dispensed with and the drum surface cleaned by cleaning brush 33.

Figure 3:
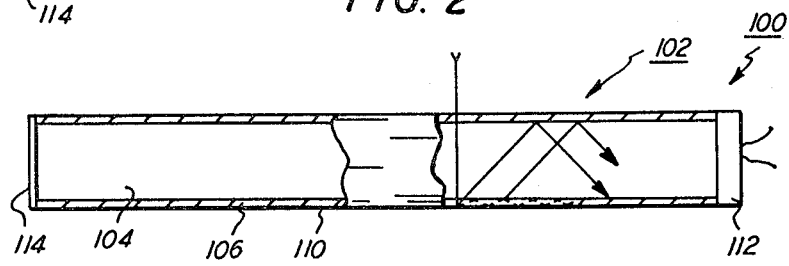
FIG. 3 is a cross-sectional view of the light collector shown in FIG. 2.

Referring particularly to FIGS. 2 and 3, collector 100 comprises a rod-like element 102, the inner or central core 104 of which is comprised of a relatively hard homogenous transparent material such as glass, plastic, etc. One suitable material comprises polymethyl methacrylate.

To protect the rod 102 against loss in light collecting efficiency due to accumulations of dirt, toner dust, and the like on the rod surface, particularly from toner dust originating from the nearby developing station 22, and to improve collector efficiency, the outer surface of core 104 is covered, i.e. clad, with a suitable cladding material 106 having an index of refraction lower than the index of refraction of core 104. One suitable cladding material 106 comprises a low-index flurocarbon compound.

The outer periphery of the cladding material 106, except for a slit-like aperture 108 extending axially along the length of rod 102 is covered with a suitable light diffusing coating or covering 110 which may for example comprise titanium dioxide. A suitable light detector such as a photocell 112 is provided at one end of the rod 102 for sensing light transmitted axially along the collector interior. A suitable specular reflecting surface 114 such as aluminum foil, is provided at the opposite end of collector 100 to reflect light back along the rod interior toward photocell 112. Alternately, the reflecting surface may comprise a suitable diffusing material.

Collector 100 is supported in spaced relation to the photoconductive surface 19 by suitable means (not shown), with the slit-like aperture 108 facing the photoconductive surface 19. Preferably, the longitudinal axis of collector 100 is parallel with the axis of rotation of drum 18.

Referring particularly to FIG. 3 of the drawings, light reflected from the photoconductive surface 19 during scanning of the developed image thereon by beam 63 when operating in the READ mode passes into the interior of collector 100 via the slit-like aperture 108. Light substantially normal to the collector 100 passes through the cladding material 106 and inner core 104 and strikes the light diffusing coating 110 which diffuses and reflects the light back toward the collector interior at various angles of incidence, the light returning through the cladding material 106 to the core 104 where the light is reflected back and forth along the core interior in a direction axial of rod 102. Due to the diffusion of the light beyond the critical angle of reentry into core 104, some light passing through the cladding material 106 is reflected within the bounds of the cladding material, creating secondary diffusion.

The diffused light propagates axially along the length of rod 102 and the cladding material 106, the light being reflected by and within both the rod 102 and the cladding material 106. Light reaching the end of collector 100 adjacent photocell 112 is detected by photocell 112. Light transmitted through rod 102 and cladding material 106 and reaching the opposite end of collector 100 is reflected back along the axis of collector rod 102 toward photocell 112 by the reflecting surface 114 to intensify the brightness of the light striking photocell 112. Where the reflecting surface 114 is composed of a diffusing material, the light reaching the rod end is diffused back into the rod/cladding material interior.

Photocell 112 generates analog image signals in response to the presence or absence of light, the signal level being representative of the intensity of the light striking photocell 112. The resulting signal output of photocell 112 is representative of the developed image on the photoconductive surface scanned by image READ beam 63.

Figure 4:
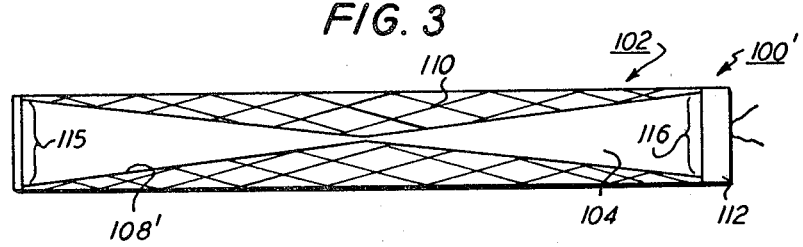
FIG. 4 is a side view of an alternate light collector construction providing a variable sized light aperture.

In the embodiment shown in FIG. 4, where like numerals refer to like parts, the size of the aperture 108' of the collector 100' thereshown is varied in order to provide a uniformity of response along the length of the collector. In the example shown, the degree of wrap around of the light diffusing coating 110 is at a maximum at some point along the rod length, with the degree of wrap thereafter diminishing as the rod ends 115, 116 are approached. In one example, the maximum degree of wrap around of coating 110 is adjacent the rod center with minimum degree of wrap around at the rod ends 115,116.

In use, collector 100' is supported adjacent the photoconductive surface 19 of drum 18 in the manner described heretofore with the variable size aperture 108' thereof opposite to and facing photoconductive surface 19. While aperture 108' is shown as being uniformly varied, non-uniform variations may instead be contemplated, for example a stepped aperture.

Figure 5:
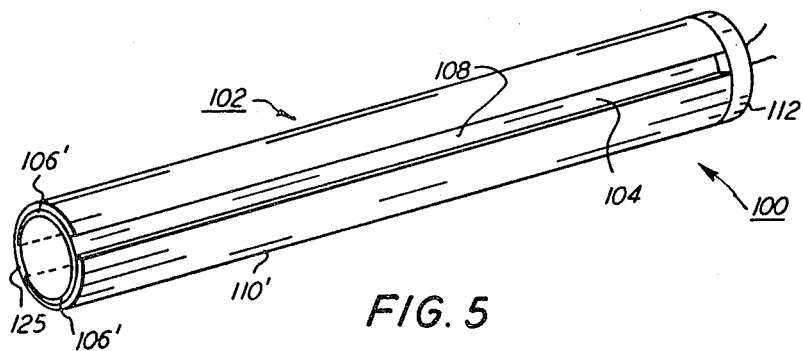
FIG. 5 is an isometric view of a second alternate light collector construction wherein a portion of the cladding material is removed and a light diffusing coating substituted therefor.
Figure 6:
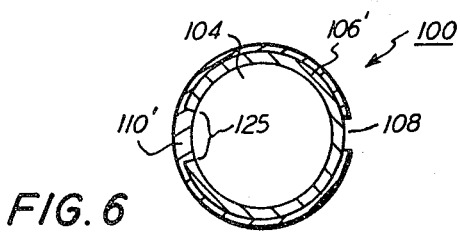
FIG. 6 is an enlarged cross-sectional view of the light collector shown in FIG. 5.

Referring now to the embodiment shown in FIGS. 5 and 6 of the drawings, where like numerals refer to like parts, the collector thereshown has a slit-like portion 125 of the cladding material 106 diametrically opposite light receiving aperture 108 removed in order to increase the trapping of light within the high transmission modes of the clad rod, and to reduce the trapping of light within the cladding material 106 as in the FIGS. 1–3 embodiment. Light diffusing coating 110' covers the outer periphery of the remaining cladding material 106' as well as the portion 125 of rod 102 where cladding material has been removed to further enhance the efficiency of the collector and to minimize effects of dirt, etc.

In the FIGS. 4 and 5 embodiments, light reflected from the photoconductive surface 19 enters rod 102 through aperture 108. Light rays pass directly across the rod 102 and strike the surface of rod 102 covered by diffusing coating 110'. Coating 110' diffuses the light rays back to the interior of the rod 102 where the rays are reflected by cladding material 106, the reflected rays passing axially along rod 102 toward the ends thereof where the light is sensed by photodiode 112 or reflected toward photodiode 112 by reflecting surface 114.

In this embodiment, the diffusing coating 110 serves to diffuse a fraction of the entering light rays at an angle greater than the critical angle through which cladding material 106 transmits light. As a result, the cladding material 106 reflects rather than transmits the light striking the cladding material to reduce light loss and increase efficiency.

While a single photosensor 112 is illustrated at one end of collector 100, it will be understood that photosensors may be provided at both ends of collector 100. In that event, reflecting material 114 would be dispensed with.

While collector 100 is disclosed herein in conjunction with apparatus for scanning images developed on a photoconductive surface, it will be understood that the collector of the present invention may be used with other types of scanning systems as for example, where a document original is read by a raster scanner.

While the invention has been described with reference to the structure disclosed, it is not confined to the details set forth, but is intended to cover such modifications or changes as may come within the scope of the following claims.

I claim:

1. A light collector for use with a flying spot scanner adapted to raster scan images developed on the photoconductive surface of a xerographic type copying apparatus, said collector being disposable opposite said photoconductive surface to collect light reflected from said photoconductive surface when scanning images developed on said photoconductive surface, the improvement comprising:
   (a) a transparent central core;
   (b) a layer of cladding material covering the periphery of said core except for a first slit-like aperture, the axis of said first aperture extending in a direction substantially parallel to the axis of said core;
   (c) a layer of light diffusing material covering the outer periphery of the portion of said core exposed at said first aperture and covering the outer periphery of said cladding material except for a second slit-like aperture substantially opposite said first aperture, said second aperture extending in a direction substantially parallel to the axis of said core and permitting light reflected from said photoconductive surface to enter said collector; and
   (d) a photosensor at at least one end of said collector, said photosensor being operatively coupled to said collector to enable said photosensor to sense light transmitted axially along said core whereby to provide image signals representative of the image scanned,
   light reflected from said photoconductive surface passing through said second aperture and said cladding material and through said core to strike said light diffusing material at said first aperture, said light diffusing material diffusing said light and reflecting said light back into said core, a portion of the diffused light in said core being reflected by said cladding material axially along said core to said photosensor.

2. The collector according to claim 1 in which said collector includes a single photosensor at one end thereof, and specularly reflecting means at the opposite end of said collector for reflecting light transmitted through said core and said cladding material toward said photosensor.

3. The collector according to claim 1 in which said collector includes a single photosensor at one end thereof, and diffuse reflecting means at the opposite end of said collector for diffusing light transmitted through said core back into said core.

4. In a combination xerographic copier and raster scanner adapted to scan developed images on the copier with a light beam, a transparent collector rod spaced opposite to and astride the path of movement of said photoconductive surface for collecting light reflected from said photoconductive surface, a light sensor at one end of said rod, and cladding means covering the exterior of said rod, the improvement comprising:
   a slit-like aperture in said cladding;
   a diffusing surface covering said cladding means and said aperture except for a second slit-like aperture substantially opposite said first mentioned aperture, said second aperture enabling light reflected from said photoconductive surface to enter said rod,
   said diffusing surface diffusing light entering said rod through said second aperture into said rod interior.

5. A light collector for use with a flying spot scanner adapted to raster scan images, said collector being disposable opposite the image to be scanned to collect light reflected from said image, the improvement comprising:
   (a) a transparent central core;
   (b) a layer of cladding material covering the periphery of said core except for a slit-like aperture;
   (c) a layer of light diffusing material covering said core at said aperture and the outer periphery of said cladding material, except for a second slit-like aperture opposite said first-mentioned aperture, said second aperture permitting light reflected from the image being scanned to enter said core, the axes of said first and second apertures extending in a direction substantially parallel to the axis of said core; and
   (d) a photosensor at at least one end of said collector, said photosensor being operatively coupled to said collector to enable said photosensor to sense light transmitted axially along said core whereby to provide image signals representative of the image being scanned,
   light reflected from the image being scanned passing through said second aperture and said cladding material, and through said core to said light diffusing material at said first aperture;
   said light diffusing material diffusing said light and reflecting said light back into said core, diffused light in said core being reflected by said cladding material axially along said core to said photosensor.

* * * * *